T. L. RUBINSTEIN.
APPAREL SHIRT.
APPLICATION FILED AUG. 20, 1913.
1,138,895.  Patented May 11, 1915.
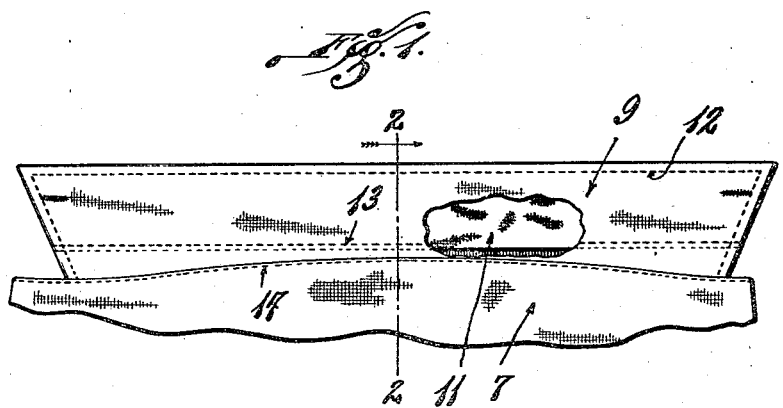
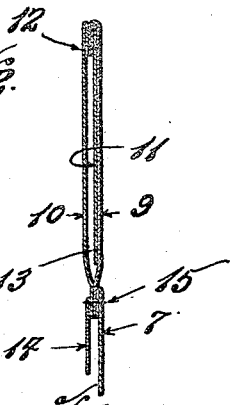
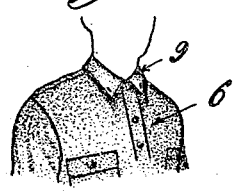
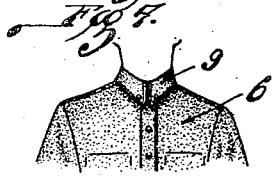
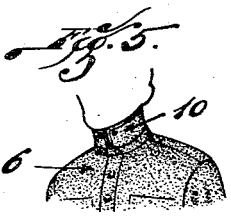
ATTEST
E. M. Harrington
N. G. Butler
INVENTOR
Tobias L. Rubinstein,
By Higdon & Longan, attys.

UNITED STATES PATENT OFFICE.

TOBIAS L. RUBINSTEIN, OF ST. LOUIS, MISSOURI, ASSIGNOR TO THE NEW ERA MANUFACTURING COMPANY, OF ST. LOUIS, MISSOURI, A CORPORATION OF MISSOURI.

APPAREL-SHIRT.

1,138,895.  Specification of Letters Patent.  Patented May 11, 1915.

Application filed August 20, 1913. Serial No. 785,797.

*To all whom it may concern:*

Be it known that I, TOBIAS L. RUBINSTEIN, a citizen of the United States, and resident of St. Louis, Missouri, have invented certain new and useful Improvements in Apparel-Shirts, of which the following is a specification containing a full, clear, and exact description, reference being had to the accompanying drawings, forming a part thereof.

My invention relates to improvements in apparel shirts and is directed particularly to "outing" or flannel shirts, and the object of my invention is to construct a collar for this class of shirts that may be more readily folded into different positions so that the same collar may be employed as an ordinary flat or negligée collar, a military collar or a storm collar.

With the above purposes in view my invention consists in certain novel features of construction and arrangement of parts as will be hereinafter more fully described, pointed out in the claim and illustrated by the accompanying drawings, in which—

Figure 1 shows in plan a collar and a portion of a shirt constructed according to my invention, one wall of the collar being partially broken away; Fig. 2 is a transverse sectional elevation through a portion of the shirt and the collar taken on the line 2—2 of Fig. 1; Fig. 3 shows the shirt as in use with the collar in a flat or negligée position; Fig. 4 is a view similar to Fig. 3 showing the shirt with the collar as a military collar; and Fig. 5 shows the shirt as in use with the collar entirely folded up employed as a storm collar.

Referring by numerals to the accompanying drawings: 6 designates the body of the shirt which may be of any desired style. Secured to the shirt body and to the yoke thereof is a collar band 7 which is of ordinary construction, that is having greater height at its longitudinal center than at its ends, the top margin of the band being substantially curved as shown in Fig. 1.

9 and 10 designate the two plies of the collar each of which is inturned or hemmed at its free edge and secured by a line of stitching 12 which also passes through the turned edge of a lining 11. Said turned edge is completely incased by the hem of ply 9. Lining 11 lies between plies 9 and 10 and its inner straight edge which is stitched to ply 9 ends short of the neckband 7 to which plies 9 and 10 are secured by a line of stitching 15. Neckband 7 and its lining 14 are inturned or hemmed at their edges, all as shown clearly in cross section, Fig. 2. This last mentioned line of stitches 15 is on a curved line conforming with the shape of the upper margin of the band, while the line of stitches 13 uniting the collar lining to the bottom of the collar is on a straight line which is nearer to the line of stitches 15 at the longitudinal center of the collar than at its ends.

For the purpose of holding the collar smooth and in a definite shape some sort of lining is necessary and heretofore this lining has been extended over the folding line of the collar. When a collar was intended for only one use, say the flat condition as shown in Fig. 3, the collar could be shaped to lay in this flat condition, but when collars are intended to be formed into different shapes, as contemplated in this application, it is desirable to terminate the lining short of the folding line so that it is not necessary to fold the lining. Thus a collar intended for one use, such as the flat collar shown in Fig. 3, may be folded into other forms such as the military or the storm collars, shown in Figs. 4 and 5, without causing "bunching" of the walls of the collar over the folding line.

For the reason that the line of stitching uniting the lining to the one wall of the collar is out of parallelism with the line of stitching uniting the collar as a whole to the shirt and its band there exists wider folding lines or areas that may be more readily folded at the ends of the collar than at the middle of the collar so that the folding line may change as required in shifting the collar from the flat condition, shown in Fig. 3, to the military collar shown in Fig. 4.

I claim:

In an apparel shirt, a collar comprising two plies, each having an inturned hem at its free edge, a lining, having a turned edge, arranged between the plies and having its turned edge incased by one of said hems and its opposite edge secured to one of said plies only, a neck band comprising two plies, each of which are secured to the plies of the collar, the lines of securing between the collar and neck band and between the plies of the collar and its lining being spaced throughout their lengths and out of parallelism so that there will be a wider folding line at the collar ends than at its middle.

In testimony whereof, I have signed my name to this specification, in presence of two subscribing witnesses.

TOBIAS L. RUBINSTEIN.

Witnesses:
E. L. WALLACE,
EDWARD E. LONGAN.